July 30, 1963 E. FRANK 3,099,715
FREQUENCY MODULATION OR AMPLITUDE MODULATION TRANSMITTING SYSTEM
Filed June 20, 1960
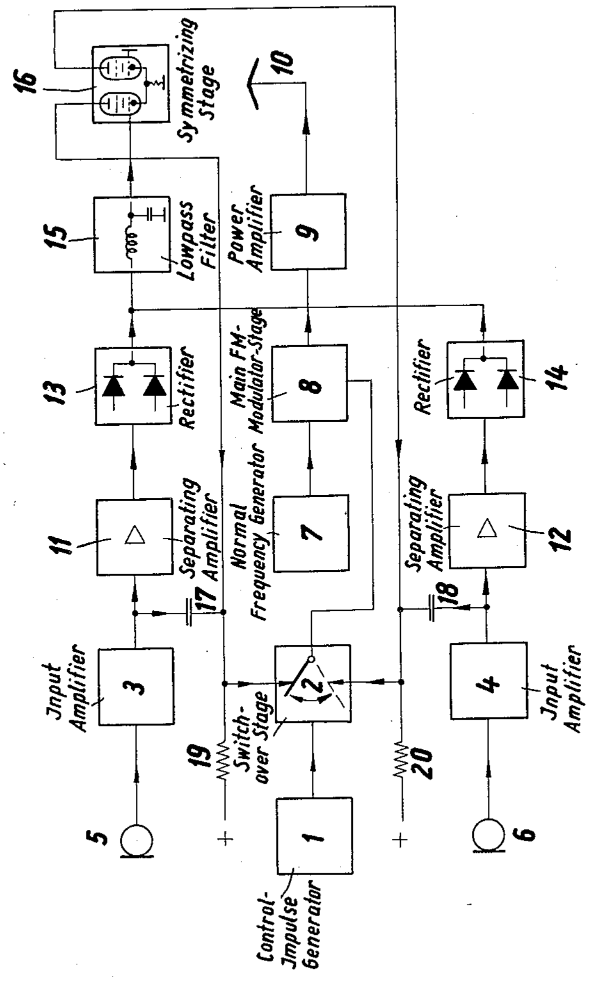
Jnventor:
Egon Frank United States Patent Office 3,099,715
Patented July 30, 1963

3,099,715

FREQUENCY MODULATION OR AMPLITUDE MODULATION TRANSMITTING SYSTEM

Egon Frank, Berlin-Mariendorf, Germany, assignor to Loewe Opta Aktiengesellschaft, Berlin-Steglitz, Germany, a company of Germany Filed June 20, 1960, Ser. No. 37,522
Claims priority, application Germany June 26, 1959
4 Claims. (Cl. 179—15)

Subject of the present invention is a further development of a frequency modulation or amplitude modulation transmitting system dealt with in applicant's U.S. patent application Serial No. 13,396, filed March 7, 1960. In this system two signals are transmitted on a common high frequency carrier according to the time multiplex system, preferably for compatible two-channel stereophonic transmission, and the transmitter modulation and receiver low frequency channels are keyed synchronously at alternate periods in an impulse rhythm lying above the sound frequency range.

According to the said application, the chief feature of the transmitting system lies in the fact that the two LF signals are combined by superimposing alternately with a positive and negative D.C.-voltage respectively of a preferably rectangular shape by means of a switching-over stage operating in a rhythm of supersonic frequency, and then modulated on the high frequency carrier in such a way that the LF signal of the one channel is superimposed on said positive D.C.-voltage impulse, whilst the LF of the other channel is also superimposed on said negative D.C.-voltage impulse. If coherent LF signals are used, the upper and lower envelope curves of the arising wave train run parallel during the transmission of conformable voltages for both stereo signals. The average mean value of this wave train contains the sum of the signals of both channels for monaural reproduction after normal demodulation in the receiver, preferably after integration via a low pass filter, or after a second demodulation by means of two normal rectifiers, preferably diode rectifiers poled in opposition, directly or behind a low pass filter, each of the two stereophonic signals are separately applied to the two following LF amplifier sections and the appertaining loudspeakers.

A further possibility for the technical execution of the transmitting system forming the subject of applicant's prior U.S. patent application lies in the use not only of an alternate rectangular D.C.-potential for superimposing with the LF signals, but specially rounded carrier wave shapes, in particular sine semi-waves for reducing the spectral width, with their positive and negative trains forming a pure sine wave, in particular at no-load.

The present invention aims at improving the transmitting system according to the applicant's prior U.S. patent application Serial No. 13,396 by improving the effective ratio of the interference and useful voltage in the receiver, i.e. an increase in the degree of suppression for extraneous interference voltages in the receiver.

With receivers having only moderate limiting properties, the amplitude value for the switching frequency carrier selected in the applicant's prior application in consideration of the largest possible degree of modulation at 50% of the maximum permissible modulation deviation causes the temporal centre point of the respective carrier frequency value to lie more or less far beyond the frequency centre with large modulation deviation. Since, however, the majority of receivers are equipped with limiters which, as a ratio detector for example, are so arranged that their ratio of interference voltage to useful voltage becomes unfavourable with increasing deviation from the frequency centre, the present method has in certain cases a disadvantage owing to the fact that the above-mentioned technical features of the method, in particular at small modulation amplitudes, cause the interference background noises at high noise level to be more audible than the usual transmission method.

The purpose of the present invention is now to obtain an improvement of the transmitting system in this respect. The main idea of the invention consists in the reduction of the switching frequency carrier at no load or with a small amount of LF modulation to such a degree that, at the transmitter end, said switching impulse amplitude of the e.g. rectangular or sine semi-wave shaped switching carrier is not kept constantly at 50% of the maximum permissible degree of modulation but is variable dependent on the LF amplitude. Here, the condition is that, with the smallest amplitude of the switching carrier, a perfect switching function of the diodes (cf. 23 and 24 in FIG. 3 of applicant's prior application) in the stereo demodulator is assured with certainty. The magnitude of the D.C.-voltage or the switching carrier amplitude necessary to fulfill this condition should, at no-load, be considerably smaller than 50% of the maximum permissible modulation deviation (cf. claim 18 of the U.S. application Serial No. 13,396) preferably about 10 to 20% of the maximum permissible modulation deviation.

For faultless operation of the system, the centre line of the modulation range must also never be exceeded, i.e. the switching carrier amplitude for every state of modulation must always be larger than the largest of the two superimposed LF amplitudes since otherwise, on exceeding the centre line, the switching diodes of the stereo demodulator would cease to operate. Therefore, according to the invention, the switching carrier amplitude is raised with increasing LF degree of modulation, and this amplitude value must always be the same simultaneously in both channels and always somewhat larger than the respective larger LF amplitude in both channels.

In this connection, in order to obtain an unaltered mean value of the FM carrier frequency and coupling free from direct current, e.g. RC coupling, of the stereo modulator at the FM demodulator connected in front, the mean value of the impulse amplitude must always be controlled in the same manner in both directions of polarity and so must be influenced by the same control process in order to avoid an overmodulation of the diodes. Therefore, a control voltage must be produced for each channel dependent on its LF signal amplitude. However, by means of a suitable device, only the larger of the two control voltages is used and employed for the control of the switching carrier amplitude of both channels and polarities respectively.

Since the amplitude control of the D.C.-voltage or switching carrier must always be carried out with a certain safety factor, i.e. must always be somewhat larger than the larger of the two LF signal amplitudes, a further device must be provided to see that the maximum value mentioned above and in the said U.S. patent application Serial No. 13,396 for the switching carrier amplitudes of approximately 50% of the maximum permissible degree of modulation (cf. claim 18 of the U.S. patent application Serial No. 13,396) is not exceeded with occasional LF full volume but is confined to this value. This is necessary so as not to exceed the maximum FM total modulation limit occurring including the full LF addition. Therefore, according to the invention a limiter device is inserted after the generator of the control voltage which limits the maximum value for the switching carrier amplitude to the above-mentioned value.

For the faultless functioning of the whole transmitting system, it is also of vital importance to see that the control time constants lie within certain limits. On the one hand, with sudden occurrences of large LF amplitudes after a previous no-load state, the switching carrier amplitude must be able to accept practically at once the full value or at least a value corresponding to the respective LF amplitude since otherwise the stereo demodulator cannot completely respond at once. On the other hand, the upward control impulse should not have an excessively high slope since then the receiver loudspeakers would reproduce crackling noises. It is best to arrange for the response time of the control voltage generator to be in the range of 0.1 to 1.0 millisecond. However, the time constants for the cut-out control process can be made considerably larger and uncritical since the physiological downward adaptation of the ear is subject to certain delay in reaction. The time constants practically in use are those of about 0.1 to 5 seconds.

For the practical execution of the present system, for example, in accordance with the patent application Serial No. 13,396 a special AM modulator is required which effects the superimposition of the two LF signal frequencies with a—for example—rectangular or in the individual channel sine half-wave shaped switching carrier frequency. Certain solutions can be obtained to carry out the desired additional aim in accordance with the present invention simply by making the feed of the control voltage effective as modulation organ by series connection with the two LF signals at the control electrodes. However, the switching carrier amplitude can also be controlled in or after the switching carrier generator or before the impulse modulator (cf. 2 in FIG. 1 of the patent application Serial No. 13,396).

In order to make possible a transmission which is as far as possible free from distortion in particular from transient processes in the connection to no-load or small LF signals, the best technical solution for the present system is the diversion of the whole LF signal in each channel separately via a transit time delay device and then only to feed it to the modulator at the moment when the upward control of the switching carrier—starting immediately and corresponding to the new, enlarged LF level—has already ended. In order to bring about a smooth, i.e. inaudible transfer from the small to the larger or largest possible switching carrier amplitude i.e. 50%, a rise period of 10 to 100 milliseconds is necessary. Accordingly, the LF signals must be delayed by the same period via the transit time or storage systems used before going to the modulator.

The means used for the transit time delay can be various, for example, for shorter delay periods, purely electric, L-C-R transit time chains can be used whilst for longer periods, either electronic storage devices mechanically at rest or storage devices operating together with mechanically moved parts, in particular magnetogram carriers can be used (echo machines).

Finally, as storage systems mechanically at rest, devices are possible according to which a large number of electronic switches transmit charging amounts from e.g. electrostatic storage units (condenser battery) proportional to the LF signal to the modulator. Then, on tapping off the stored signal, quantified trains of, for example, rectangular impulses are obtained, the frequency of which is best harmonized to the switching carrier frequency. Such a graduated storage can also, for example, be obtained by means of a rapidly rotating switch with a large number of contacts or by means of an electronic beam switching device.

The invention is described—by way of an example—in the accompanying drawing showing a block scheme in which—corresponding with FIG. 1 of the U.S. patent application Serial No. 13,396—1 is the control generator for the alternately gating frequency (e.g. 35 kc.), 2 the gating or switch-over stage, 3 and 4 input amplifiers, 5 and 6 the signal sources, e.g. microphones, 7 the ultra-short wave control generator of the transmitter, 8 the main-modulator for frequency modulation, 9 the power amplifier of the transmitter, and 10 the transmitter antenna.

This block scheme is—according to the present invention—completed by the following parts: 11 and 12 are separating amplifiers, 13 and 14 push-pull rectifiers, 15 a low-pass filter for smoothing the positive-control voltage impulses and for suppressing or shunting any residual low frequency components. 16 is a direct voltage amplifier and symmetrizing stage the anode resistances of which couple-in the direct voltage components of equal amplitude and opposite phase and add them to the signal components coupled-in via the coupling condensers 17 and 18. The composed signal is transferred from the output of the gating stage 2 to the FM main modulator 8 either—as shown—directly or by switching-in a low pass filter altering the square switching carrier form into a sine form.

What is claimed is:

1. A frequency modulation signal transmitting system using two signals modulated on a common high-frequency carrier wave according to the time multiplex system for compatible two-channel stereophonic transmission comprising a control impulse generator, two signal sources for generating two different low-frequency input signals, a pair of input amplifiers for amplifying said input signals, means for producing a positive and a negative D.C.-voltage variably dependent on said low-frequency input signal amplitudes, and for alternate superimposition with said input signals, a switch-over stage, a main high-frequency frequency-modulator stage, a subsequent power stage for amplifying the modulated high-frequency signals to be transmitted, an aerial system, connected to said power stage, said switch-over stage being connected to said control impulse generator as well as to both said input signal sources via said input amplifier stages, said means for producing a positive and a negative D.C.-voltage consisting of a pair of separating amplifier stages, a pair of rectifier stages, a low-pass filter, and a symmetrizing stage, one of said amplifier stages and one of said rectifier stages being each connected in series between the output of one of said input amplifiers and said low-pass filter, the output of which is connected to said symmetrizing stage having two output lines connected for applying two D.C.-voltage components of equal amplitude and of opposite polarity to said switch-over stage, the positive of said D.C.-voltage components being thus superimposed with the one of said input signals, and the negative of said D.C.-voltage components being thus superimposed with the other of said input signals.

2. A frequency modulation signal transmitting system as set forth in claim 1, wherein said means for producing a positive and a negative D.C.-voltage being so dimensioned that the voltage amplitude at no-load is considerably smaller than 50% of the maximum permissible modulation amount.

3. A frequency modulation signal transmitting system as set forth in claim 1, wherein said means for producing a positive and a negative D.C.-voltage being so dimensioned that the voltage amplitude at no-load is not higher than 20% of the maximum permissible modulation amount.

4. A frequency modulation signal transmitting system as set forth in claim 1, wherein said means for producing a positive and a negative D.C.-voltage being so dimensioned that the voltage amplitude at no-load is raised with an increasing degree of low-frequency modulation and that this amplitude value is always the same simultaneously in both channels and always larger than the respective larger low-frequency value in both channels.

References Cited in the file of this patent

UNITED STATES PATENTS 2,874,221 Dauguet ---------------- Feb. 17, 1959
2,921,981 Kidd ------------------ Jan. 19, 1960